Nov. 1, 1955     R. LAPSLEY     2,722,300

CLUTCH

Filed April 22, 1952

INVENTOR.
ROBERT LAPSLEY
BY *Brown, Jackson,*
*Boettcher & Dienner*
ATTYS.

United States Patent Office 2,722,300
Patented Nov. 1, 1955

2,722,300

CLUTCH

Robert Lapsley, Buchanan, Mich., assignor to Clark Equipment Company, Buchanan, Mich., a corporation of Michigan Application April 22, 1952, Serial No. 283,553

4 Claims. (Cl. 192—53)

My present invention relates generally to clutches and, more specifically, is directed to a clutch construction for clutching two rotating members together only at substantially synchronous speed.

The clutch construction of my present invention comprises a shaft or driven member on which is journaled a gear or drive member. Non-rotatably mounted on the shaft, but axially movable therealong, is a clutch collar member which is adapted to be moved into clutching engagement with the gear for clutching the latter to the shaft for conjoint rotation therewith.

It is an object of my present invention to provide a clutch construction, as noted, including blocker means for preventing the clutch collar member from being disposed in clutching engagement with the gear when the latter and the shaft are rotating asynchronously.

It is a further object of my present invention to provide a clutch construction, of the character described, wherein the clutch collar member is adapted to move the blocker means out of blocking relation, when the gear and the shaft begin to rotate synchronously, so as to permit the clutch collar member to be disposed in clutching engagement with the gear.

It is another object of my present invention to provide a clutch construction, as noted, wherein shift means is provided for spring loading the clutch collar member for effecting movement of the latter into clutching engagement with the gear at substantially the moment that the gear and shaft begin to rotate synchronously.

To accomplish the above objects, I contemplate, in the preferred embodiment of my present invention, the provision of blocking means comprising a pin member extending through the shaft. The pin member, at its one end, is adapted to engage the clutch collar member, and, at its other end, is adapted to engage the inner periphery of the gear in which are formed one or more cooperating cam grooves. When the shaft and gear are rotating asynchronously, the one end of the pin member extends outwardly of the periphery of the shaft and blocks axial movement of the clutch collar member toward a clutching position. However, when the shaft and the gear are rotating synchronously and the clutch collar member is biased toward a clutching position, the said one end of the pin member is urged inwardly of the shaft out of blocking position and the said other end of the pin member is received in one of the cam grooves formed in the gear, thus permitting the clutch collar member to move into clutching relation with the gear.

It is a feature of my present invention that the centrifugal force acting on the pin member serves to normally prevent engagement of the said other end of the pin member with the cam grooves thus eliminating wear and noise when the clutch collar member is not biased toward a clutch position.

Now, in order to acquaint those skilled in the art, with the manner of constructing and using clutches in accordance with the principles of my present invention, I shall describe in connection with the accompanying drawing a preferred embodiment of my present invention.

Figure 1:
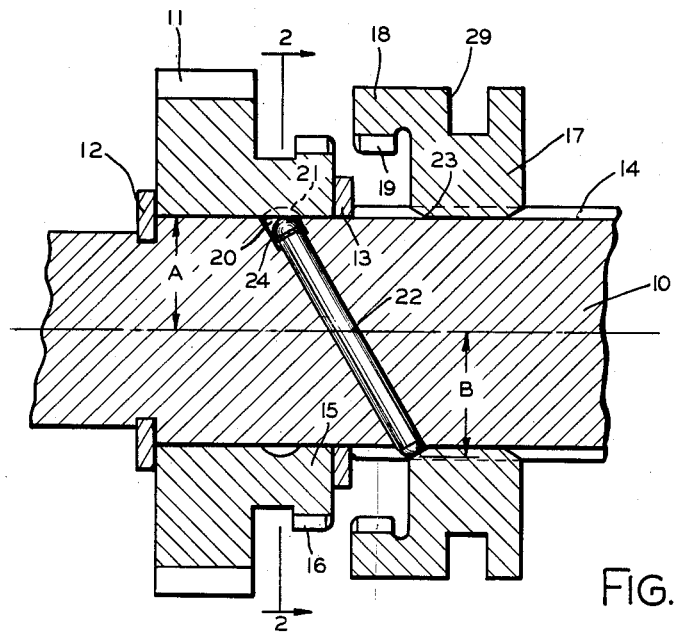
Figure 1 is a vertical longitudinal sectional view of the clutch construction of my present invention.
Figure 2:
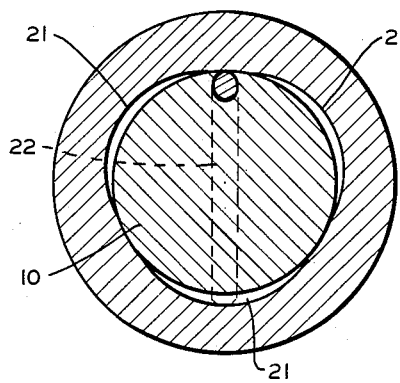
Figure 2 is a vertical transverse sectional view of a portion of the clutch construction of my present invention, taken along the line 2—2 in Figure 1, looking in the direction indicated by the arrows.

Referring now to the drawing, there is indicated by the reference numeral 10 a shaft or driven member upon which is journaled a gear or drive member 11. The gear 11 is adapted to be selectively clutched to the shaft 10 for conjoint rotation therewith, by means of the clutch of my present invention. The gear 11 is maintained in axial position by means of a pair of annular retaining rings 12 and 13, the retaining ring 12 being secured within the outer periphery of the shaft 10 and the retaining ring 13 abutting the ends of a plurality of circumferentially spaced straight splines 14 formed in the outer periphery of the shaft 10.

The gear 11 is formed with a rearwardly extending annular hub portion 15 in the outer periphery of which are formed a plurality of circumferentially spaced external jaw clutch teeth 16. Non-rotatably mounted on the splines 14 of the shaft 10 is a clutch collar member 17 which is adapted to be moved axially therealong. The clutch collar member 17 is formed with a forwardly extending annular portion 18 in which are formed a plurality of circumferentially spaced internal jaw clutch teeth 19. The jaw clutch teeth 19 are adapted to be disposed selectively in engagement with the jaw clutch teeth 16 of the gear 11 for clutching the latter to the shaft 10.

I shall now describe the details of construction of the blocker means of my present invention which serves to prevent engagement of the clutch collar member 17 with the gear 11 when these elements are rotating asynchronously. A diagonal opening 20 extends through the shaft 10 and disposed therein is a pin or blocker member 22. The pin or blocker member 22, at its forward end, is adapted to engage the inner periphery of gear 11 in which, in the preferred form of my invention, three cam grooves 21 are formed. The pin 22, at its rear end, is adapted to engage the cam portion 23 of the clutch collar member 17. It is to be observed that when the forward end of the pin member 22 is in engagement with a high point of the inner periphery of the gear 11, the rear end of the pin extends outwardly of the outer periphery of the shaft 11 and blocks axial movement of the clutch collar member 17 to the left from the position shown in Figure 1. The perpendicular distance B between the axis of the cam portion 23 and the axis of the shaft 10 is greater than the perpendicular distance A between a high point of the inner periphery of the gear 11 and the axis of the shaft 10. As a result, the pin 22 will normally be urged, by centrifugal force, away from the cam grooves 21 thus eliminating wear and noise when the clutch collar member is not biased toward a clutching position. Likewise, it is to be noted that when the forward end of the pin member 22 is urged into one of the cam grooves 21, the rear end of the pin member 22 is withdrawn within the outer periphery of the shaft 10 thereby permitting the clutch collar member 17 to be shifted to the left from the position shown in Figure 1. A stop ring 24 is secured to the forward end of the pin member 22 to prevent the latter from dropping out of the opening 20 in the event that the clutch collar member 17 is moved to an extreme right position.

Figure 3:
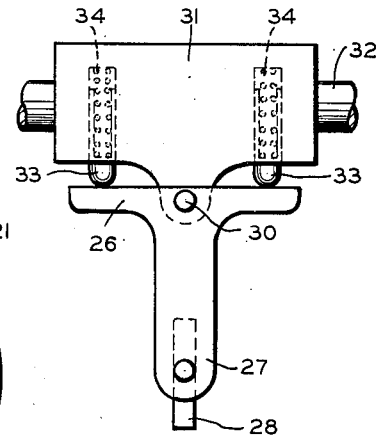
Figure 3 is a side elevational view of the shift means provided for effecting shifting of the clutch collar member of the clutch construction of my present invention.

Axial movement of the clutch collar member 17 is adapted to be effected by means of shift means shown in Figure 3. The shift means comprises a shift fork 26 having bifurcated ends 27. Rotatably mounted in the lower ends of the shift fork 26 are a pair of opposed facing jaw members 28 which are disposed in the annular groove 29 formed in the clutch collar member 17. The shift fork 26, adjacent its upper end, is pivotally mounted by a pivot pin 30 to the depending leg of a box-like support member 31. The box member 31 is, in turn, fixedly mounted to a horizontal rod 32 which is either manually or automatically axially shiftable. A plurality of tubular plungers 33 are disposed in vertical openings formed in the box member 31, adjacent each corner thereof. The bottom ends of the plungers 33 are biased, by means of springs 34, into engagement with the upper end of the shift fork 26 and while normally maintaining the fork 26 in a vertical position permit the latter to rock about the pivot pin 30.

The operation of the clutch of my present invention is as follows. When it is desired to effect clutching of the gear 11 to the shaft 10, the rod 32 of the shift means is shifted to the left from the position shown in Figure 3. Upon movement of the shaft 32 and box member 31 to the left, the shift fork 26 will pivot or rotate counter-clockwise about the pivot pin 30 compressing the plungers 33 at the right end of the box member 31. The compressed plungers 33 will exert a clockwise moment on the shift fork 26 which will spring load the clutch collar member 17 and tend to bias the latter to the left from the position shown in Figure 1.

If the gear 11 and shaft 10 are rotating asynchronously, the high points of the cam grooves 21, engaging the forward end of the pin member 22, will maintain the latter in a position projecting outwardly of the periphery of the shaft 10. In this position of the pin 22, the rear end thereof engages the cam portion 23 of the clutch collar member 17 thus, blocking axial movement of the latter to the left. It should be observed that the spring load clutch collar member 17 will, through the cam surface 23, exert a force on the pin 22 tending to cause the rear end of the latter to move away from the clutch collar member 17. At the instant that synchronous speed is reached between the gear 11 and the shaft 10, the aforedescribed force acting upon the pin member 22 will cause the forward end of the latter to move into one of the cam grooves 21. When this occurs, the rear end of the pin member 22 is withdrawn from engagement with the cam surface 23 of the clutch collar member 17 and the latter is permitted to move axially to the left from the position shown in Figure 1. After the forward end of the pin member 22 has moved into one of the cam grooves 21, the plungers 33 at the right end of the box member 31 will cause the shift fork 26 to rotate clockwise about pin member 30, thereby thrusting the clutch collar member 17 to the left disposing the jaw clutch teeth 19 into engagement with the jaw clutch teeth 16 of gear 11. With the jaw clutch teeth 16 and 19 in engagement, the gear 11 is clutched to the shaft 10.

It will be understood that the clutch collar member 17 may be moved back to the position shown in Figure 1 by first moving the shaft 32 of the shift means to the right. When the shaft 32 is thus moved, the shift fork 26 will initially pivot or rotate clockwise about the pin member 30 compressing the plungers 33 at the left end of the box member 31. After the driving force has been removed from the faces of the jaw clutch teeth 16 and 19, the plungers 33 at the left end of the box member 31 will cause the shift fork 26 to rotate counterclockwise about pin member 30 thereby thrusting the clutch collar member 17 to the position shown in Figure 1 disengaging the jaw clutch teeth 16 and 19. Simultaneously, centrifugal force will thrust the pin member 22 away from the cam grooves 21 thus permitting the gear 11 to rotate freely on the shaft 10.

It is believed that the above description will clearly demonstrate that I have provided a clutch for clutching two rotating elements together only at substantially synchronous speed which clutch employs a minimum number of parts that may be easily fabricated and assembled.

Now, while I have shown and described what I believe to be a preferred embodiment of my present invention, it will be understood that various modifications and rearrangements may be made therein without departing from the spirit and scope of my present invention.

I claim:

1. In combination, a shaft, a gear journaled on said shaft, a clutch collar member non-rotatably mounted on said shaft and axially movable therealong for selectively clutching said gear to said shaft, a blocking pin extending diagonally through said shaft with one end engaging said clutch collar member for normally preventing axial shifting of said clutch collar member into clutching engagement with said gear, at least one cam groove formed in the inner periphery of said gear for receiving the other end of said blocking pin, and said clutch collar member being adapted to move said other end of said blocking pin into said cam groove out of blocking relation only when said gear and said shaft rotate synchronously to permit said clutch collar member to be disposed in clutching engagement with said gear.

2. In combination, a shaft, a gear journaled on said shaft, a clutch collar member non-rotatably mounted on said shaft and axially movable therealong for selectively clutching said gear to said shaft, said clutch collar member having an annular cam portion, a blocking pin extending diagonally through said shaft and at one end engaging said cam portion of said clutch collar member for normally preventing axial shifting of said clutch collar member into clutching engagement with said gear, at least one cam groove formed in the inner periphery of said gear for receiving the other end of said blocking pin, the perpendicular distance between the axis of said cam portion of said clutch collar member and the axis of said shaft being greater than the perpendicular distance between the portion of the inner periphery of said gear uninterrupted by a cam groove and the axis of said shaft so that centrifugal force acting on said blocker pin will normally prevent engagement of said other end of said blocker pin with said cam grooves thus eliminating wear and noise, and said clutch collar member being selectively adapted to move said other end of said blocking pin into said cam groove out of blocking relation only when said gear and said shaft rotate synchronously to permit said clutch collar member to be disposed in clutching engagement with said gear.

3. In combination, a shaft, a gear journaled on said shaft, a clutch collar member non-rotatably mounted on said shaft and axially movable therealong for selectively clutching said gear to said shaft, a blocking pin extending through said shaft and at one end engaging said clutch collar member for normally preventing axial shifting of said clutch collar member into clutching engagement with said gear, at least one cam groove formed in the inner periphery of said gear for receiving the other end of said blocking pin, means for spring loading said clutch collar member toward a clutching position whereby when said gear and said shaft rotate substantially synchronously said clutch collar member forces said blocking pin into said cam groove thereby permitting said clutch collar member to engage the said gear.

4. In combination, a shaft, a gear journaled on said shaft, said gear having external jaw clutch teeth, a clutch collar member splined on said shaft for axial movement therealong, said clutch collar member being formed with internal jaw clutch teeth which are adapted to be disposed in engagement with the jaw clutch teeth of said gear, a blocking pin extending diagonally through said shaft and at one end engaging said clutch collar member for normally preventing axial shifting of said clutch collar member into a clutching position, at least one cam groove formed in the inner periphery of said gear for receiving the other end of said blocking pin, means for spring loading said clutch collar member toward a clutching position whereby when said gear and said shaft rotate substantially synchronously said clutch collar member forces said blocking pin into said cam groove thereby permitting the jaw clutch teeth of said clutch collar member to engage the jaw clutch teeth of said gear.

References Cited in the file of this patent

UNITED STATES PATENTS

| | | |
|---|---|---|
| 2,417,566 | Polomski | Mar. 18, 1947 |
| 2,562,612 | Halberg | July 31, 1951 |

FOREIGN PATENTS

| | | |
|---|---|---|
| 464,102 | Great Britain | Apr. 9, 1937 |